US010212568B2

United States Patent
Samuelsson et al.

(10) Patent No.: US 10,212,568 B2
(45) Date of Patent: Feb. 19, 2019

(54) SELECTIVE USER INTERACTION IN A DYNAMIC, PROXMITY-BASED GROUP OF WIRELESS COMMUNICATION DEVICES

(71) Applicant: CRUNCHFISH AB, Malmö (SE)

(72) Inventors: Joachim Samuelsson, Helsingborg (SE); Carl Tönsgård, Malmö (SE); Joakim Nydemark, Malmö (SE); Örjan Johansson, Lund (SE); Paul Cronholm, Malmö (SE)

(73) Assignee: CRUNCHFISH AB, Malmö (SE)

( * ) Notice: Subject to any disclaimer, the term of this patent is extended or adjusted under 35 U.S.C. 154(b) by 0 days.

(21) Appl. No.: 15/524,690

(22) PCT Filed: Nov. 6, 2015

(86) PCT No.: PCT/SE2015/051175
§ 371 (c)(1),
(2) Date: May 5, 2017

(87) PCT Pub. No.: WO2016/072924
PCT Pub. Date: May 12, 2016

(65) Prior Publication Data
US 2018/0124549 A1    May 3, 2018

(30) Foreign Application Priority Data
Nov. 7, 2014 (SE) ........................ 1400535

(51) Int. Cl.
| H04B 7/00  | (2006.01) |
| H04W 4/80  | (2018.01) |
| H04W 8/00  | (2009.01) |
| H04W 4/02  | (2018.01) |
| H04L 12/18 | (2006.01) |

(Continued)

(52) U.S. Cl.
CPC ............. *H04W 4/80* (2018.02); *H04L 12/189* (2013.01); *H04W 4/023* (2013.01); *H04W 4/08* (2013.01);
(Continued)

(58) Field of Classification Search
CPC ....... H04W 4/80; H04W 4/023; H04W 8/005; H04W 4/08; H04W 4/06; H04W 60/04; H04W 84/12
See application file for complete search history.

(56) References Cited

U.S. PATENT DOCUMENTS 7,505,779 B1   3/2009 David
9,426,836 B2 * 8/2016 Johnsson ................ H04W 4/70
(Continued)

OTHER PUBLICATIONS

International Search Report and Written Opinion of PCT/SE2015/051175 dated Feb. 11, 2016.
(Continued)

*Primary Examiner* — Nhan T Le
(74) *Attorney, Agent, or Firm* — Burr Forman McNair (57) ABSTRACT

A method is provided for establishing a dynamic, proximity-based group of wireless communication devices to support potential interaction between a user of a first wireless communication device and one or more users of the wireless communication devices in the dynamic, proximity-based group. In the method, the first wireless communication device sends a short-range wireless beacon broadcast message to other wireless communication devices in a proximity zone around the first wireless communication device. The short-range wireless beacon broadcast message is adapted for requesting the other wireless communication devices to send a response message to a server. The server registers responding devices among the other wireless communication devices. The first wireless communication device communicates with the server to enable the user of the first
(Continued)

wireless communication device to interact selectively with one or more of the users of the registered wireless communication devices, wherein said one or more users are less than all users of the registered wireless communication devices.

32 Claims, 6 Drawing Sheets

(51) Int. Cl.
    *H04W 4/08*    (2009.01)
    *H04W 60/04*   (2009.01)
    *H04W 4/06*    (2009.01)
    *G06F 3/048*   (2013.01)
    *H04W 84/12*   (2009.01)
    *H04L 29/08*   (2006.01)

(52) U.S. Cl.
CPC ........... *H04W 8/005* (2013.01); *H04W 60/04* (2013.01); *G06F 3/048* (2013.01); *H04L 67/06* (2013.01); *H04W 4/06* (2013.01); *H04W 84/12* (2013.01)

(56) References Cited

U.S. PATENT DOCUMENTS

| | | | |
|---|---|---|---|
| 9,967,918 B2* | 5/2018 | Yi | H04W 88/04 |
| 2005/0239405 A1 | 10/2005 | Myyry et al. | |
| 2006/0160555 A1* | 7/2006 | Kobayashi | H04L 45/00 |
| | | | 455/522 |
| 2008/0219227 A1 | 9/2008 | Michaelis | |
| 2010/0317392 A1 | 12/2010 | Davis et al. | |
| 2013/0151608 A1 | 6/2013 | Wiseman et al. | |
| 2013/0309972 A1 | 11/2013 | Setlur et al. | |
| 2014/0185499 A1 | 7/2014 | Ray et al. | |
| 2017/0164332 A1* | 6/2017 | Kim | H04W 76/10 |

OTHER PUBLICATIONS

Examination report of SE 1400535-9 dated Feb. 12, 2016.
Chapter II International Preliminary Report on Patentability of PCT/SE2015/051175 dated Sep. 29, 2016.
Extended Search Report and Written Opinion of 15856550.7 dated May 25, 2018.

* cited by examiner

SELECTIVE USER INTERACTION IN A DYNAMIC, PROXMITY-BASED GROUP OF WIRELESS COMMUNICATION DEVICES

TECHNICAL FIELD

This application relates to a method and an associated wireless communication device and server for selective user interaction in a dynamic, proximity-based group of wireless communication devices.

BACKGROUND

As wireless communication devices have become immensely well spread in the human community, certain needs have arisen. For instance, it is desired for users of wireless communication devices to interact with other users in the neighborhood, preferably in a manner which is quick and convenient, yet controllable by the respective user.

SUMMARY

The inventors of the present invention have conceived a concept referred to as a bubble. The inventors realized, after inventive and insightful reasoning, that by utilizing a short-range wireless beacon broadcast technology in combination with a server, a dynamic, proximity-based group of wireless communication devices can be established which supports potential interaction between a user of a first wireless communication device and one or more users of the wireless communication devices in said dynamic, proximity-based group in a manner which is more versatile than existing methods. The methodology allows a user of a wireless communication device to keep readily updated about not only the presence of other users in the vicinity, but also the identities, numbers or categories of their users. The methodology also allows the user to interact selectively with a subset of all available users, as well as to share content with such users in a convenient and controllable manner.

One aspect of the present invention therefore is a method of establishing a dynamic, proximity-based group of wireless communication devices to support potential interaction between a user of a first wireless communication device and one or more users of the wireless communication devices in said dynamic, proximity-based group. The method comprises the first wireless communication device sending a short-range wireless beacon broadcast message to other wireless communication devices in a proximity zone around the first wireless communication device, wherein the short-range wireless beacon broadcast message is adapted for requesting the other wireless communication devices to send a response message to a server. The server registers responding devices among said other wireless communication devices. The first wireless communication device communicates with the server to enable the user of the first wireless communication device to interact selectively with one or more of the users of the registered wireless communication devices, wherein said one or more users are less than all users of the registered wireless communication devices. Such selective interaction may for instance pertain to telephone call, short text messaging, multimedia messaging, email messaging, chat conversation, content sharing, or social media invitation/friending In a first advantageous embodiment, the method is used for providing, in a user interface of the first wireless communication device, one or more of the following:

information about identities of the users of the registered wireless communication devices;

an indication of the number of the users of the registered wireless communication devices; and information which categorizes the users of the registered wireless communication devices into one or more categories.

In a second advantageous embodiment, which may be combined with the first embodiment, the method is used for controllable sharing of content, such as for instance pictures, videos, audio files, messages, texts, or social media profiles. In the second embodiment, the method further comprises the first wireless communication device sending a sharing request to the server, wherein the sharing request relates to content to be made shareable by the server. The first wireless communication device sends a sharing announcement to other wireless communication devices in a proximity of the first wireless communication device, wherein the sharing announcement is either said short-range wireless beacon broadcast message or a second short-range wireless beacon broadcast message. The sharing announcement is adapted for notifying the other wireless communication devices about the shareable content being accessible at the server. The server applies, for each of said other wireless communication devices which are requesting access to the shareable content, a sharing constraint rule for limiting the access to the shareable content to a subgroup of all of said other wireless communication devices in the proximity of the first wireless communication device, so that each requesting device is either admitted to receive the shareable content, or not admitted to receive shareable content.

Another aspect of the present invention is a first wireless communication device, configured to send a short-range wireless beacon broadcast message to other wireless communication devices in a proximity zone around the first wireless communication device, the short-range wireless beacon broadcast message being adapted for requesting the other wireless communication devices to send a response message to a server, wherein the server is configured to register responding devices among said other wireless communication devices. The first wireless communication device is moreover configured to communicate with the server to enable the user of the first wireless communication device to interact selectively with one or more of the users of the registered wireless communication devices, wherein said one or more users are less than all users of the registered wireless communication devices. Still an aspect of the present invention is a server for use with the first wireless communication device according to the aspect above. The server is configured to register responding devices among said other wireless communication devices, and communicate with the first wireless communication device to enable the user of the first wireless communication device to interact selectively with one or more of the users of the registered wireless communication devices, wherein said one or more users are less than all users of the registered wireless communication devices. Other aspects, objectives, features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
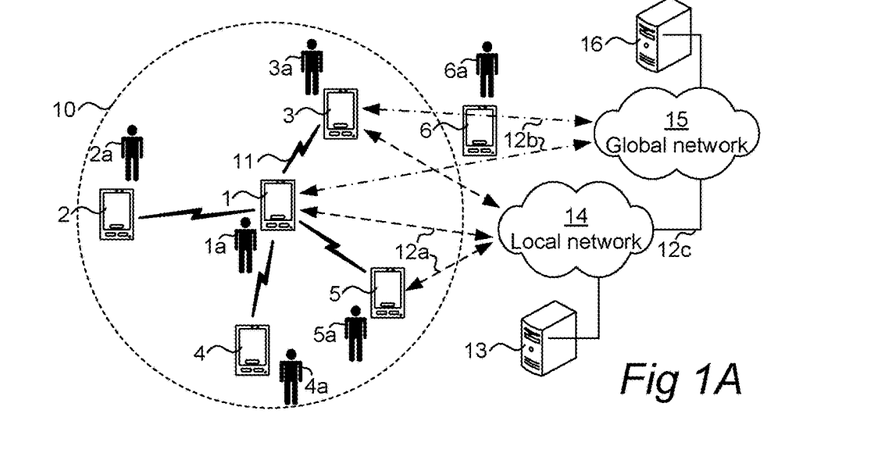
FIGS. 1A, 1B and 1C illustrate the bubble concept.
Figure 1B:
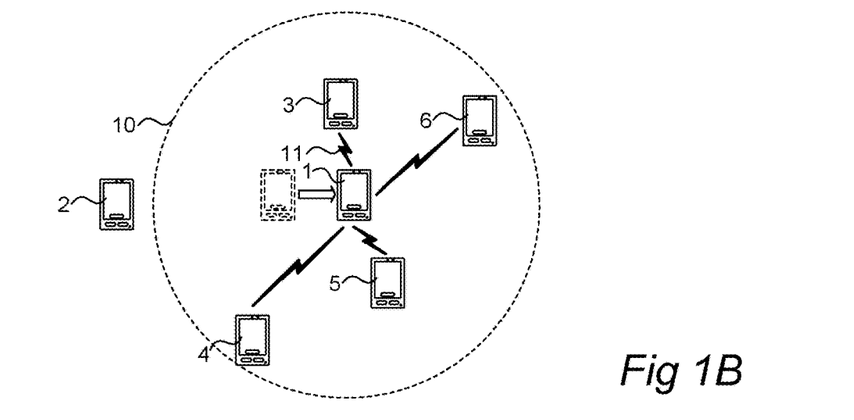
Figure 1C:
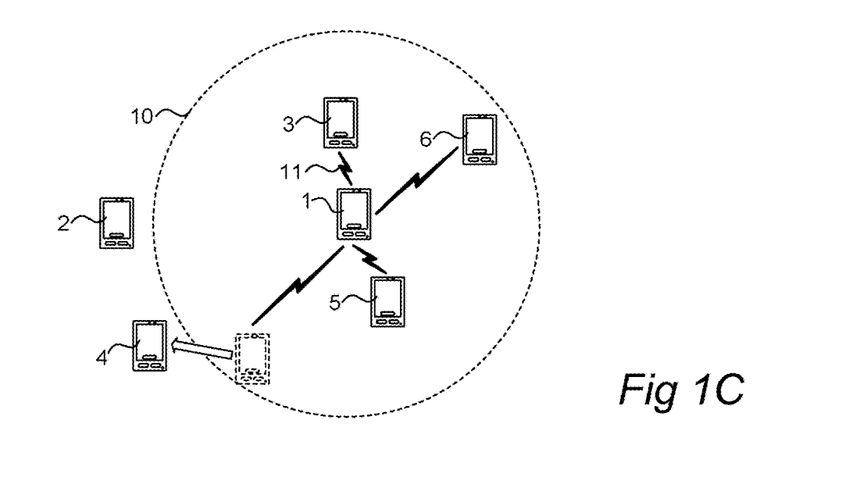

FIGS. 1A-1C are schematic illustrations of a concept referred to as a "bubble", upon which embodiments of the present invention are based. A plurality of wireless communication devices 1-6 is seen in FIGS. 1A-1C. Each wireless communication device may typically be a mobile telecommunications terminal such as a mobile phone (e.g. smartphone), a tablet computer (e.g. surfpad), a personal digital assistant, a laptop computer, a game console, etc. Each wireless communication device is therefore typically portable, but at least some of them could alternatively be stationary, for instance desktop computers or computer integrated displays.

The wireless communication devices 1-6 can communicate with one or more servers 13, 16 over a local communication network 14 (see dashed arrows 12a), and/or a global communication network 15 (see dashed-dotted arrows 12b), and/or over both of the networks (see solid line 12c). The local communication network 14 may for instance be a wireless local area (WLAN) network compliant with IEEE 802.11 (WiFi), and the global communication network 15 may for instance be a cellular telecommunication network compliant with W-CDMA/HSPA, GSM, UMTS or LTE, supporting for instance TCP/IP based communication. Two exemplifying embodiments of a wireless communication device will be described in more detail later with reference to FIGS. 6A, 6B and 7. In an alternative embodiment, one or more of the servers 13, 16 may be implemented wholly or partly as a functional unit in any of the wireless communication devices 1-6.

The bubble concept will now be explained.

As seen in FIG. 1A, a first wireless communication device 1 has a proximity zone 10 within which it can reach, and can be reached by, other wireless communication devices 2, 3, 4 and 5 by way of short-range wireless beacon broadcast messages 11. Wireless communication devices which are too far away from the first wireless communication device 1, including wireless communication device 6 in FIG. 1A, are currently not reachable by short-range wireless beacon broadcast messages 11 and are hence currently outside of the proximity zone 10.

The wireless communication devices 1-6 have respective users 1a-6a, as seen in FIG. 1A. From the perspective of the user 1a of the first wireless communication device 1, the users 2a, 3a, 4a and 5a of the wireless communication devices 2, 3, 4 and 5 are currently available for interaction. The bubble for the user 1a (and inherently his first wireless communication device 1) thus currently consists of the users 2a, 3a, 4a and 5a (and inherently their respective wireless communication devices 2, 3, 4 and 5).

As will be better understood from various embodiments described in more detail later, interaction may for instance involve sharing of content which may be created and/or stored locally in the wireless communication device, or retrieved to or transmitted from the wireless communication device using the local communication network 14 and/or the global communication network 15. Non-limiting examples of content include pictures, videos, audio files, messages, texts, or social media profiles. Other kinds of interaction may include telephone call, short text messaging, multimedia messaging, email messaging, chat conversation, or social media invitation/friending Furthermore, as will described in more detail later, embodiments of the present invention will enable a user of a wireless communication device (for instance user 1a of the first wireless communication device 1) to interact selectively with one or more—as distinct from all—of the other users currently in the user's bubble. This will be referred to as segmentation of a user's bubble.

Moreover, as will described in more detail later, enabling such selective interaction may typically involve identifying, counting and/or categorizing the other users which are currently in a user's bubble. The situation in FIG. 1A is an exemplifying temporal snapshot; the bubble for the user 1a of the first wireless communication device 1 consists, at that particular moment in time, of the users 2a, 3a, 4a and 5a. The situation may change at any time, for instance when any of the wireless communication device 1-6 moves.

A first example of this is seen in FIG. 1B where the first wireless communication device 1 has moved with respect to the other wireless communication devices 2-6. As a result, the proximity zone 10 moves with the first wireless communication device 1. In FIG. 1B, this causes two changes. First, the wireless communication device 2 is now positioned outside of the proximity zone 10; therefore the user 2a will disappear from the bubble for user 1a. Second, the wireless communication device 6 will now be positioned inside of the proximity zone 10; therefore the user 6a will enter the bubble for user 1A. The bubble for user 1a in FIG. 1B will thus consist of users 3a, 4a, 5a and 6a.

A second example of a bubble change for user 1a is seen in FIG. 1C. Here, the wireless communication device 4 has moved away from the first wireless communication device 1 (and the other wireless communication devices 3, 5 and 6). As a result, the wireless communication device 4 is now positioned outside of the proximity zone 10; therefore the user 4a will disappear from the bubble for user 1a. The bubble for user 1a in FIG. 1C will thus consist of users 3a, 5a and 6a.

As is clear from the description above, a bubble for a user of a certain wireless communication device can be seen as a dynamic, proximity-based group of wireless communication devices which supports potential interaction between the user of said certain wireless communication device and one or more users of the wireless communication devices in said dynamic, proximity-based group.

Figure 2A:
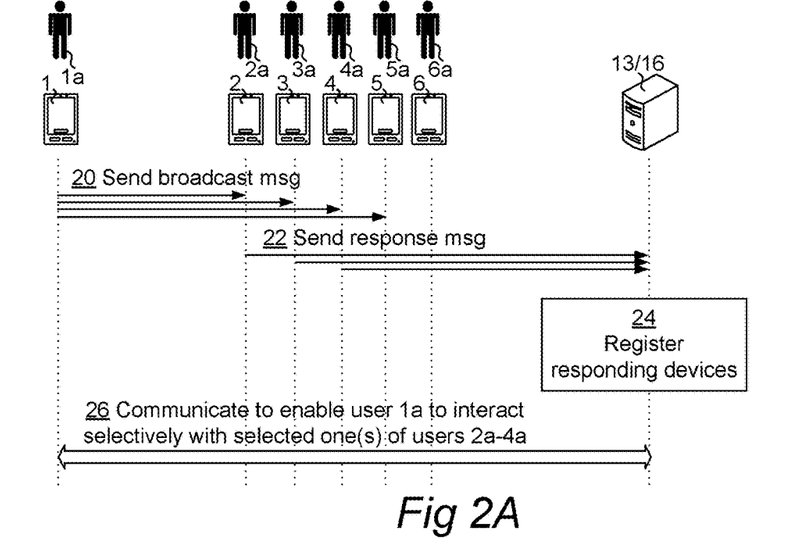
FIG. 2A illustrates establishment of the bubble for a user of a first wireless communication device on a generic technical level for one embodiment.

FIG. 2A illustrates establishment of the bubble for the user 1a of the first wireless communication device 1 on a generic technical level for one embodiment, the momentary situation being like in FIG. 1A above.

In a first step 20, a short-range wireless beacon broadcast message is sent by the first wireless communication device 1 and is received by the other wireless communication devices 2, 3, 4 and 5 in the proximity zone 10 of the first wireless communication device. The wireless communication device 6 is outside of the proximity zone 10 and will therefore not be able to receive the short-range wireless beacon broadcast message. The short-range wireless beacon broadcast message is adapted for requesting the receiving other wireless communication devices 2, 3, 4 and 5 to react by sending a response message. In the disclosed embodiment, the short-range wireless beacon broadcast message is an iBeacon® message (in turn being based on Bluetooth Low Energy (BLE)). The short-range wireless beacon broadcast message therefore contains a universally unique identifier (UUID) associated with the first wireless communication device 1. Other embodiments may be based on BLE directly, or on any other short-range wireless communication standard capable of transmitting beacon messages.

In the disclosed embodiment, the receiving other wireless communication device 2, 3, 4, 5 may react in a second step 22 by sending a response message to the server 13 or 16 over the local communication network 14 and/or the global communication network 15. However, situations are foreseeable where not all of the receiving other wireless communication devices 2, 3, 4, 5 will react in this way. For instance, in some embodiments, only those receiving other wireless communication devices 2, 3, 4, 5 which contain certain software functionality on an application level (e.g. a "Bubble app"), application framework level (e.g. a "Bubble plug-in") or operating system level (e.g. a "Bubble driver"), will be capable or admitted to respond in step 22. In FIG. 2A, the receiving other wireless communication devices 2, 3 and 4 actually respond in step 22 to the received short-range wireless beacon broadcast message, whereas the receiving other wireless communication device 5 does not.

The response message in step 22 contains information which identifies the responding other wireless communication device 2, 3 or 4 (for instance an UUID associated therewith, or alternatively an IP address, a MAC address, etc). The response message also contains information which identifies the first wireless communication device 1 (typically the UUID contained in the received short-range wireless beacon broadcast message).

In a third step 24, the server 13 or 16 registers the responding devices among the other wireless communication devices. In FIG. 2A, devices 2, 3 and 4 are therefore registered by the server 13 or 16 in step 24, among the devices 2, 3, 4 and 5 which received the short-range wireless beacon broadcast message sent in step 20. The server 13 or 16 now has a mapping between the identity of the first wireless communication device 1 and the identities of the other devices 2, 3 and 4. In effect, it contains sufficient information to define the current bubble for the first wireless communication device 1, since there is typically a one-to-one relation between an identity of one of the other devices 2, 3 or 4 and its respective user 2a, 3a or 4a.

Such relations between user identity and device identity may be represented in different ways. For instance, when installing a "Bubble app" in their wireless communication devices, the users may register themselves with the server 13 or 16, wherein the server 13 or 16 may allocate or register a user ID and store it together with the identity of the corresponding wireless communication device. Alternatively, a user ID may be included in the response message in step 22.

The registered mapping at the server 13 or 16 in FIG. 2A may be used in various different and beneficial ways to enable the user 1a of the first wireless communication device 1 to interact selectively with one or more of the users 2a, 3a and 4a which are currently in the user's 1a bubble, by i) identifying, counting and/or categorizing the users 2a, 3a and 4a and rendering this information available to the user 1a, and/or ii) share content with a segmented part of the bubble. This is indicated generically as communication 26 between the first wireless communication device 1 and server 13 or 16 in FIG. 2A. Various embodiments and use cases of this communication 26 will be described below.

The bubble may be updated at any time. Hence, the step 20 of the first wireless communication device 1 sending a short-range wireless beacon broadcast message to other wireless communication devices 2, 3, 4, 5 in a proximity zone 10 around the first wireless communication device 1 may be repeated according to a predetermined schedule or upon request by the user 1a, so as to update the dynamic, proximity-based, group of wireless communication devices for the first wireless communication device 1.

A first set of use cases will now be described. The first set of use cases relate to identifying, counting and/or categorizing of the users in the bubble.

Figure 3:
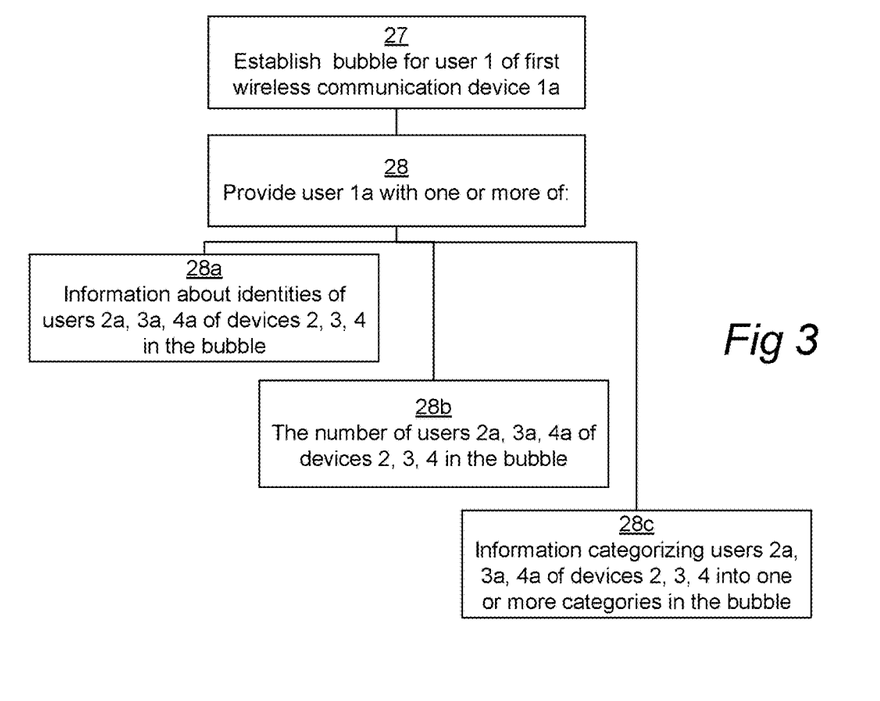
FIGS. 3 and 4 are for illustrating a first set of use cases, which relate to identifying, counting and/or categorizing of the users in the bubble.

Generally, as seen at 27 in FIG. 3, a bubble is established for the user 1 of the first wireless communication device 1a, for instance as described above for FIG. 2A. Then, as seen 28, in a user interface of the first wireless communication device 1, the user 1a is provided with one or more of the following pieces of information concerning the members of the bubble:

a) information about identities of the users 2a, 3a, 4a of the registered wireless communication devices 2, 3, 4 (see 28a), b) an indication of the number of the users 2a, 3a, 4a of the registered wireless communication devices 2, 3, 4 (see 28b), and c) information which categorizes the users 2a, 3a, 4a of the registered wireless communication devices 2, 3, 4 into one or more categories (see 28c).

The identifying information in a) will serve to assist the user 1a in any selective interaction that he may want to do with one or more of the users 2a, 3a, 4a in the bubble. Such selective interaction is facilitated by knowing who the users 2a, 3a, 4a are.

The indication in b) will represent a count of the current number of users 2a, 3a, 4a in the user's 1a bubble. The user 1a may use this indication to verify that the current number of users in the bubble corresponds to what he might have perceived manually, for instance by visual inspection of the proximity zone 10 or a subarea thereof. Such a subarea may for instance be a room in which the user 1a is currently participating in a meeting with other people. If the user 1a wants to share content exclusively with the meeting contenders (or otherwise interact exclusively with them), it is beneficial for the user 1a to be able to verify that there are no "hidden" people outside of the meeting room but within the proximity zone 10 and therefore the bubble.

The categorizing information in c) may further assist the user 1a in any selective interaction that he may want to do with one or more of the users 2a, 3a, 4a in the bubble. One possible category is whether or not each user 2a, 3a, 4a is previously known to the user 1a. The first wireless communication device 1 may determine this by checking the identity of each user 2a, 3a, 4a (or the identity of the corresponding wireless communication device 2, 3, 4) against data stored locally in the first wireless communication device 1 (such as for instance the records of a Contacts or Phonebook application), and or against data stored remote from the first wireless communication device 1 (such as for instance the friends or contacts of the user 1a in a social media application hosted by any of the servers 13 or 16).

Another possible category is whether the respective users 2a, 3a, 4a in the bubble are connected the same local communications network 14 as the user 1a, e.g. members of the same WiFi network.

Yet another possible category is a ranking based on the respective distances between the first wireless communication device 1 and the registered wireless communication devices 2, 3, 4. The distances may for instance be determined by using the iBeacon® Ranging functionality, by using a positioning service such as GPS or provided by the global communication network 15, or direct assessment of received signal strength for signals transmitted by the wireless communication devices 2, 3, 4.

Figure 4:
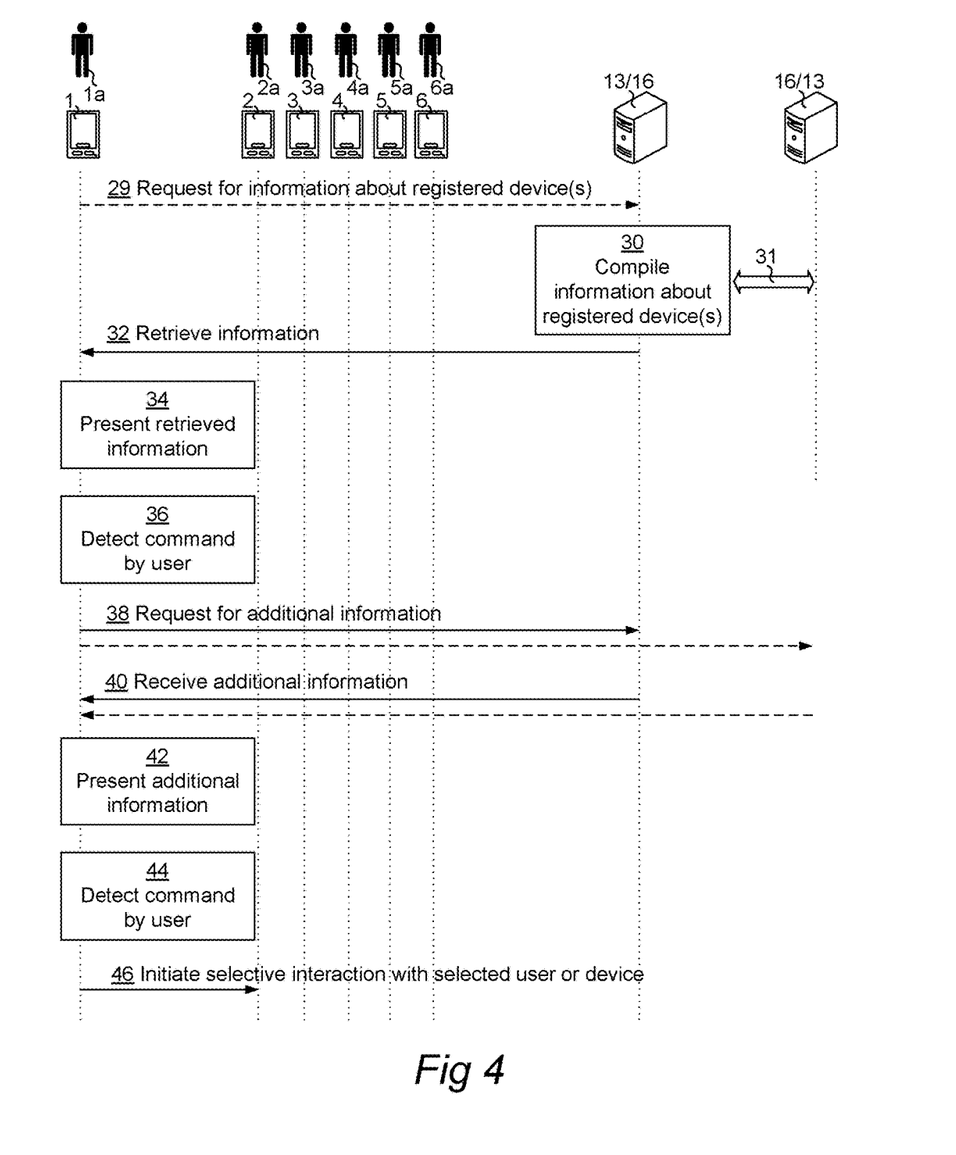

FIG. 4 illustrates one exemplary way of providing identification, counting and/or categorization of users in the bubble as referred to above. As is seen in FIG. 4, in a step 29, the first wireless communication device 1 may optionally send a request for information about the registered devices 2, 3 and 4 to the server 13/16. The request in step 29 may contain the UUIDs for the registered responding devices 2, 3, 4. For the embodiment in FIG. 2A, step 28 may be optional since the server 13/16 already has access to this information.

In a step 30, the server 13 or 16 compiles information about the registered responding devices 2, 3, 4. The compiled information may comprise identifying information about the registered wireless communication devices 2, 3, 4. Such information is useful particularly for the embodiment in FIG. 2A, i.e. in response to the request for information from the first wireless communication device 1 in step 28.

Additionally or alternatively, the compiled information may comprise identifying information about the users 2a, 3a, 4a of the registered wireless communication devices 2, 3, 4. For the embodiment in FIG. 2A where users will typically have registered in advance with the server 13/16 (for instance when installing a "Bubble app"), user profile data created upon registration with the server may be included in the compiled information by the server 13/16.

Additionally or alternatively, the server 13/16 may consult another server or external service provider 16/13 when compiling the information, as is seen at 31. For instance, the other server 16/13 may be a social media host from which the first server 13/16 may retrieve the user profile data in the form of any available public social media profiles of the users 2a, 3a, 4a.

In a step 32, the first wireless communication device 1 retrieves the compiled information from the server 13/16. Then, in a step 34, the first wireless communication device 1 presents the retrieved information in a user interface of the first wireless communication device 1. The presented information will serve to illustrate the current bubble for the user 1a and hence typically list the users 2a, 3a and 4a together with any user profile information retrieved according to the above.

In a step 36, the first wireless communication device 1 detects a command by the user 1a. The command may pertain to a selection of one or more of the members of the current bubble, i.e. one or more of the users 2a, 3a and 4a, or its corresponding device 2, 3, 4. As a result of the command in step 36, the first wireless communication device 1 may initiate selective interaction with the selected user, such as user 2a, or the corresponding device, such as device 2.

Such interaction may involve any communication channel which is available between the user 1a and the user 2a, such as for instance telephone call, short text messaging, multimedia messaging, email messaging, chat conversation, social media invitation/friending, etc.

Additionally or alternatively, as a result of the command in step 36, the first wireless communication device 1 may send a request for additional information about the selected user 2a, as is seen in step 38. The request may be sent to the same server 13/16 that was communicated with in steps 29 and 32, or to another server 16/13. The additional information request may for instance relate to a request for user profile data, such as a public social media profile, for the selected user 2a, similar to what was described above for step 31.

The requested additional information about the selected user 2a is received by the first wireless communication device 1 in a step 40 and presented in the user interface of the first wireless communication device 1 in a step 42. In a step 44, the first wireless communication device 1 detects a command by the user 1a. As a result of the command in step 44, the first wireless communication device 1 may initiate selective interaction with the selected user 2a (or the corresponding device 2) in a step 46.

Similar to what has been described above for the command detected in step 36, such interaction may involve any communication channel which is available between the user 1a and the user 2a, such as for instance telephone call, short text messaging, multimedia messaging, email messaging, chat conversation, content sharing, social media invitation/friending, etc. For embodiments where public user profiles have already been provided and presented in step 34 above, the selective interaction in step 46 may advantageously pertain to a social media invite or connection request to the user 2a. In this way, by friending or connecting with the user 2a, the user 1a may get access also to the private user profile of the user 2a.

A second set of use cases will now be described. The second set of use cases relate to segmented content sharing to a subset of the users in the bubble, i.e. a segmented bubble. The bubble may be established for instance as described above for FIG. 2A. The segmented content sharing may occur as a result of the exemplary way of providing identification, counting and/or categorization of users in the bubble as was referred to above for FIGS. 3 and 4, or as an independent chain of events. The bubble may be a current bubble or a historic bubble previously established by the server 13, 16 for the sharing device.

Figure 5:
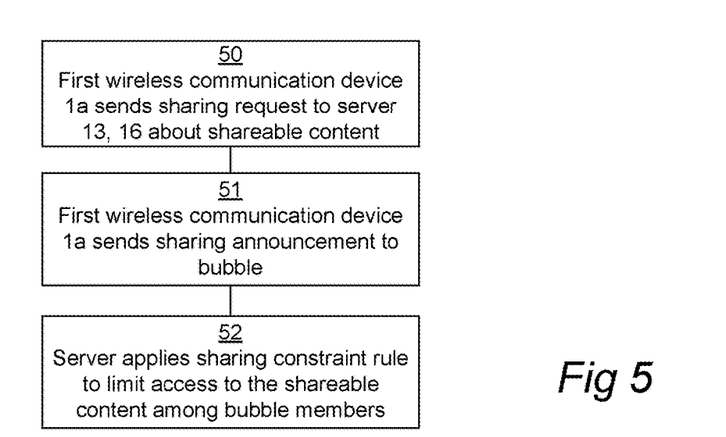
FIG. 5 is for illustrating a second set of use cases, which relate to segmented content sharing to a subset of the users in the bubble.

Generally, as is also seen in a step 50 in FIG. 5, the first wireless communication device 1 sends a sharing request to the server 13, 16. The sharing request relates to content to be made shareable by the server. In one embodiment, the content to be made shareable may exist in the first wireless communication device 1 and be uploaded to the server 13, 16 together with or in conjunction with the sharing request.

In another embodiment, the content to be made shareable exists at another data storage device accessible to the server 13, 16 over the local communication network 14 or the global communication network 15; in this case a link to the content to be made shareable may be included in or sent in conjunction with the sharing request from the first wireless communication device 1 to the server 13, 16.

In still another embodiment, the content to be made shareable may already exist at the server 13, 16, wherein only a reference about this may be included in or sent in conjunction with the sharing request from the first wireless communication device 1 to the server 13, 16.

Then, in a step 51, the first wireless communication device 1 sends a sharing announcement to other wireless communication devices 2, 3, 4, 5 in a proximity of the first wireless communication device, i.e. in the bubble. The sharing announcement is adapted for notifying the other wireless communication devices about the shareable content being accessible at the server 13, 16.

The sharing announcement may be the short-range wireless beacon broadcast message sent in step 20 of FIG. 2; in this case the sharing of content is initiated at the same time as the current bubble is established for the first wireless communication device 1

Alternatively, the sharing announcement may be a second short-range wireless beacon broadcast message, being sent either before a current bubble is established for the first wireless communication device 1, or after a current bubble is established for the first wireless communication device 1.

In a step 52, for each device 2, 3, 4, 5 which requests access to the shareable content, the server 13, 16 applies a sharing constraint rule for limiting the access to the shareable content to a subgroup of all of said other wireless communication devices in the proximity of the first wireless communication device, so that each requesting device is either admitted to receive the shareable content, or not admitted to receive the shareable content.

In one embodiment, the sharing request in step 50 and/or the sharing announcement in step 51 are/is sent as a result of a command made by the user 1a in step 36 (or possibly step 44) of FIG. 4. Here, the user 1a may make beneficial use of the information about the identities of the users in the bubble, the indication of the number of users in the bubble, or the information which categorizes the users in the bubble into one or more categories, as was described above with reference to steps 28a, 28b and 28c, respectively, of FIG. 3, and accordingly decide to share content with any of these users. Beneficially, therefore, in this embodiment the sharing constraint rule to be applied by the server is defined by the first wireless communication device 1 or its user 1a, i.e. at the sender side of the content sharing.

This may for instance involve the first wireless communication device 1 detecting, in the user interface thereof, a selection made by the user 1a of the sharing constraint rule to be applied by the server 13, 16. Hence, the user 1a may choose among a number of predefined sharing constraint rules. Examples of some sharing constraint rules which may beneficially be made selectable in this way will be given further below.

When the user 1a has selected a sharing constraint rule to be used, the first wireless communication device 1 will instruct the server 13, 16 about the selected sharing constraint rule. This instruction may be given in the sharing request in step 50 or alternatively as a separate control message from the first wireless communication device 1 to the server 13, 16.

A first example of a sender-defined sharing constraint rule according to the above is the user 1a manually selecting the ones among the users 2a, 3a, 4a, 5a in the bubble which shall be admitted to access the shareable content. To this end, the user 1a may select one or more of the identified users 2a, 3a, 4a, 5a as presented in step 36 of FIG. 4 as the one(s) which shall be admitted to access the shareable content according to the sharing constraint rule.

A second example of a sender-defined sharing constraint rule according to the above is based on a spatial segmentation of the bubble of the user 1a. The spatial segmentation may for instance be based on local presence of a subset of the users 2a, 3a, 4a, 5a in the same room as the user 1a. The sharing constraint rule will accordingly be that only users which are in the same room as the sharing user 1a shall be admitted to access the shareable content. The wireless communication device 1 may for instance determine which ones among the registered wireless communication devices 2, 3, 4, 5 that are in the same room as the wireless communication device 1 by emitting an audio signal which will only be perceivable to devices which are in the same room as the device 1. One suitable technology is disclosed in the Swedish application SE 1450293-4, the contents of which are incorporated herewith by reference.

A third example of a sender-defined sharing constraint rule according to the above is also based on a spatial segmentation of the bubble of the user 1a. Here, the spatial segmentation is a distance-based ranking of the other users' wireless communication devices 2, 3, 4, 5 with respect to the wireless communication device 1. According to this sharing constraint rule, only the n spatially closest one(s) of the other devices 2, 3, 4, 5 shall be admitted to access the shareable content, where n≥1. The distance-based ranking may for instance be established in any of the ways described above for the distance-based categorization of users in the bubble.

A fourth example of a sender-defined sharing constraint rule according to the above is based on a functional segmentation of the bubble of the user 1a. For instance, the sharing constraint rule may be defined such that requesting devices 2, 3, 4, 5, which are connected to the same wireless local area network 14 as the first wireless communication device 1, are admitted to receive the content to be shared.

A fifth example of a sender-defined sharing constraint rule according to the above is also based on a functional segmentation of the bubble of the user 1a. Here, the sharing constraint rule is defined such that requesting devices 2, 3, 4, 5 which belong to a certain category are admitted to receive the content to be shared. As has already been described previously in this document, one typical categorization is whether or not the respective users of the requesting devices 2, 3, 4, 5 are previously known to the user 1a, for instance by way of a match with records of a Contacts or Phonebook application locally in the first wireless communication device 1, or with friends or contacts of the user 1a in a social media application hosted by any of the servers 13 or 16.

A sixth example of a sender-defined sharing constraint rule according to the above is based on a temporal segmentation of the bubble of the user 1a. For instance, the server 13, 16 may keep record of a previous content sharing resulting from application of a previous sharing constraint rule for a previous set of requesting devices, and the sharing constraint rule may define that previous requesting devices which were admitted to receive the previous shareable content, will be admitted to receive the present shareable content.

A seventh example of a sender-defined sharing constraint rule according to the above is also based on a temporal segmentation of the bubble of the user 1a. Here, the sharing constraint rule defines a first-come-first-served principle, such that only the n temporally first ones among the requesting devices 2, 3, 4, 5 are admitted to receive the content to be shared, n being an integer value≥1 and less than a threshold value.

While the sharing constraint rules according to the first to seventh examples are all sender-defined, receiver-defined sharing constraint rules are also possible. Unlike the sender-defined sharing constraint rules, a receiver-defined sharing constraint rule applies only to an individual requesting device 2, 3, 4, 5. Many if not all of the above examples of sender-defined sharing constraint rules may be applied also as receiver-defined sharing constraint rules.

For instance, in a first example of a receiver-defined sharing constraint rule, the sharing constraint rule is defined such that the requesting device 2, 3, 4 or 5 will only be admitted to receive the shareable content if it is spatially close to the first wireless communication device 1.

In a second example of a receiver-defined sharing constraint rule, the sharing constraint rule is defined such that the requesting device 2, 3, 4 or 5 will only be admitted to receive the shareable content if the requesting device is in the same room as the first wireless communication device 1.

In a third example, the requesting device 2, 3, 4 or 5 is connected to a wireless local area network (such as network 14), and the sharing constraint rule is defined such that the requesting device 2, 3, 4 or 5 will only be admitted to receive the shareable content if the requesting device is connected to the same wireless local area network as the first wireless communication device 1.

In a fourth example of a receiver-defined sharing constraint rule, the sharing constraint rule is defined such that the requesting device 2, 3, 4 or 5 will only be admitted to receive the shareable content if the first wireless communication device 1 belongs to a certain category. The admitted category may for instance be where the user 1a of the first wireless communication device 1 is known to the user 2a, 3a, 4a or 5a of the requesting device 2, 3, 4, 5.

In a fifth example of a receiver-defined sharing constraint rule, the server 13, 16 keeps record of a previous content sharing resulting from application of a previous sharing constraint rule for the requesting device 2, 3, 4 or 5, and the sharing constraint rule is defined such that the requesting device will only be admitted to receive the present shareable content if the requesting device was admitted to receive the previous shareable content.

In a sixth example of a receiver-defined sharing constraint rule, the sharing constraint rule defines a first-come-first-served principle, such that the requesting device 2, 3, 4 or 5 will only be admitted to receive the shareable content if the requesting device is among the n temporally first ones among the requesting devices 2, 3, 4 or 5, n being an integer value≥1 and less than a threshold value.

Figure 6A:
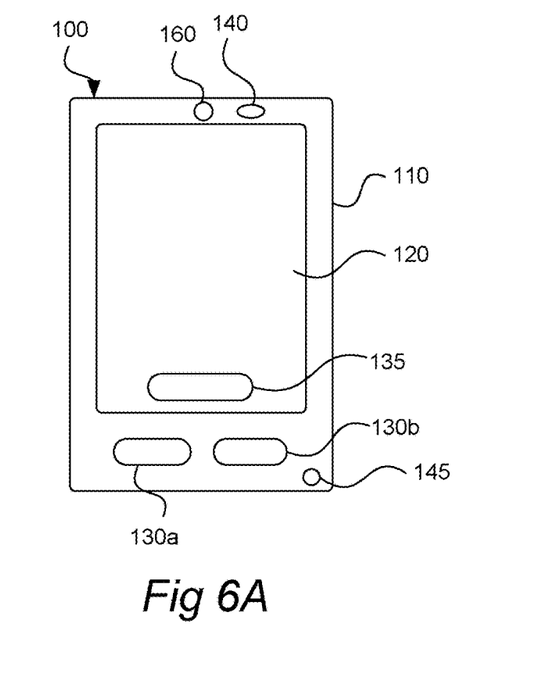
FIGS. 6A and 6B are schematic views of a wireless communication device according to two respective embodiments.
Figure 6B:
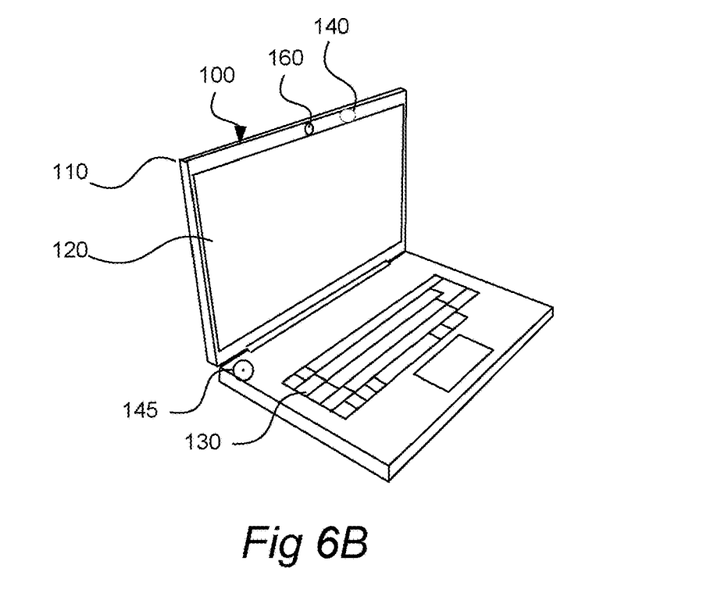

FIGS. 6A and 6b generally show a wireless communication device 100 which may implement any of the wireless communication devices 1-6 referred to above. Referring to FIG. 1A, the wireless communication device is a mobile telecommunications terminal in the form of a smartphone 100 or a tablet computer 100 (arranged with a wireless communication interface), comprising a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 depends on the design of the smartphone 100 and an application that is executed on the smartphone 100. The smartphone 100 may also be equipped with a camera 160. The camera 160 may be a digital camera that is arranged to take video or still photographs by recording images on an electronic image sensor (not shown). In one embodiment the camera 160 may be an external camera. In one embodiment the camera may alternatively be replaced by a source providing an image stream. The smartphone 100 may also be equipped with a loudspeaker 140 and a microphone 145.

Referring to FIG. 1B, a laptop computer 100 comprises a display 120 and a housing 110. The housing comprises a controller or CPU (not shown) and one or more computer-readable storage media (not shown), such as storage units and internal memory. Examples of storage units are disk drives or hard drives. The laptop computer 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable the laptop computer 100 to connect with other computing devices or a server.

The laptop computer 100 further comprises at least one input unit such as a keyboard 130. Other examples of input units are computer mice, touch pads, touch screens or joysticks, to name a few.

The laptop computer 100 may further be equipped with a camera 160. The camera 160 may be a digital camera that is arranged to take video or still photographs by recording images on an electronic image sensor (not shown). In one embodiment the camera 160 may be an external camera. In one embodiment the camera may alternatively be replaced by a source providing an image stream.

The laptop computer 100 may also be equipped with a loudspeaker 140 and a microphone 145.

The wireless communication device 100 according to FIG. 6A or FIG. 6B may be configured to detect and track an object, for instance a hand of a user, via the camera 160. How such an object is detected and tracked is disclosed in the Swedish patent application SE 1250910-5 and will not be discussed in further detail in the present application. For possible further details on this, reference is made to the mentioned Swedish patent application.

Figure 7:
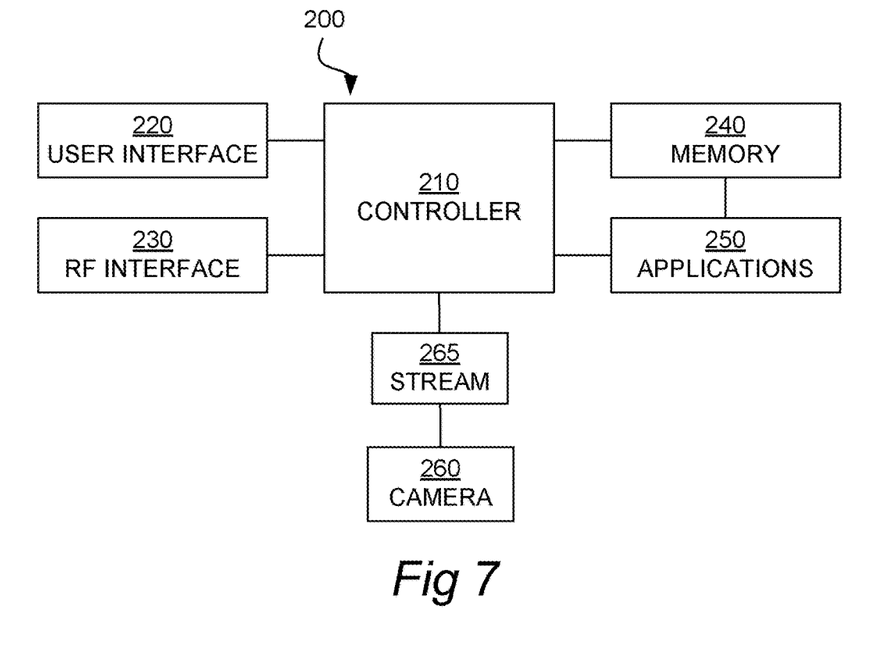
FIG. 7 is a schematic view of the components of the wireless communication device in FIG. 6A or 6B.

FIG. 7 shows a schematic view of the general structure of a wireless communication device according to FIG. 6A or FIG. 6B. The device 200 comprises a controller 210 which is responsible for the overall operation of the wireless communication device 200 and is preferably implemented by any commercially available CPU ("Central Processing Unit"), DSP ("Digital Signal Processor") or any other electronic programmable logic device. The controller 210 is configured to read instructions from a memory 240 and execute these instructions to control the operation of the wireless communication device 200. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions 250 for various software modules in the wireless communication device 200. The software modules may include a real-time operating system, drivers for a user interface 220, an application handler as well as various applications 250.

The wireless communication device 200 further comprises a user interface 220, which in the devices 100 of FIGS. 1A and 1B is comprised of the display 120 and the keys 130, 135. The user interface may also comprise the microphone 145 and the loudspeaker 144. The microphone and the loudspeaker may be arranged to form a group, as has been disclosed in the abovementioned Swedish patent application SE 1450293-4.

The wireless communication device 200 further comprises a radio frequency interface 230, which is adapted to allow the wireless communication device to communicate with other devices through a radio frequency band through the use of different radio frequency technologies. Examples of such technologies are short-range standards IEEE 802.11, IEEE 802.15, ZigBee, WirelessHART, WiFi and Bluetooth® and long-range standards W-CDMA/HSPA, GSM, UTRAN and LTE to name a few. It should be noted that, as is commonly known, the radio frequency interface may be arranged to communicate according to more than one technology and many different combinations exist, for example a smartphone is commonly arranged to communicate according to the Bluetooth® standard, the WiFi standard and the LTE standard.

The wireless communication device 200 is further equipped with a camera 260. The camera 260 is a digital camera that is arranged to take video or still photographs by recording images on an electronic image sensor (not shown).

The camera 260 is operably connected to the controller 210 to provide the controller with a video stream 265, i.e. the series of images captured, for further processing possibly for use in and/or according to one or several of the applications 250.

In one embodiment the camera 260 is an external camera or source of an image stream.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 8:
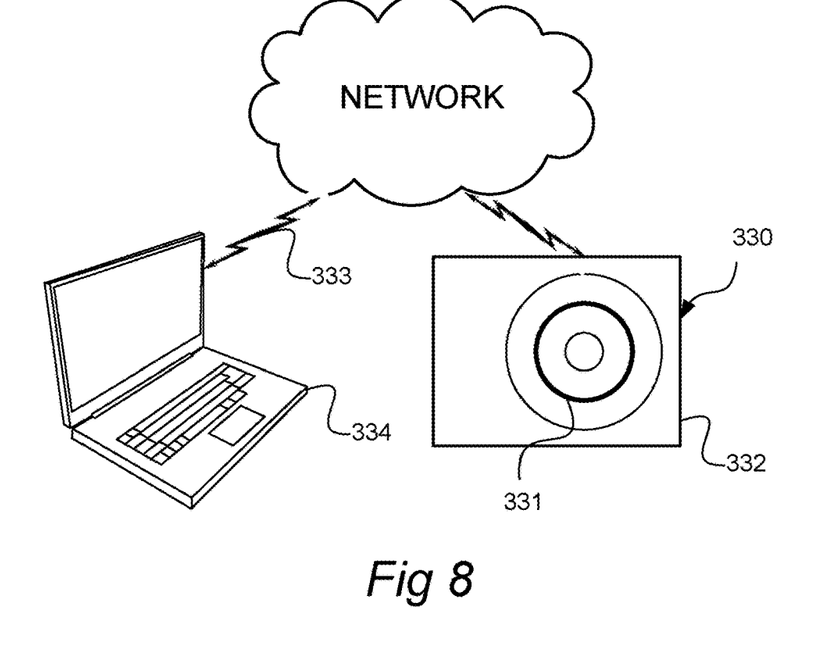
FIG. 8 is a schematic view of a computer-readable medium.

FIG. 8 shows a schematic view of a computer-readable medium as described in the above. The computer-readable medium 330 is in this embodiment a data disc 330. In one embodiment the data disc 330 is a magnetic data storage disc. The data disc 330 is configured to carry instructions 331 that when loaded into a controller, such as a processor, executes a method or procedure according to the embodiments disclosed above. The data disc 330 is arranged to be connected to or within and read by a reading device 332, for loading the instructions into the controller. One such example of a reading device 332 in combination with one (or several) data disc(s) 330 is a hard drive. It should be noted that the computer-readable medium can also be other media such as compact discs, digital video discs, flash memories or other memory technologies commonly used.

The instructions 331 may also be downloaded to a computer data reading device 334, such as a laptop computer or other device capable of reading computer coded data on a computer-readable medium, by comprising the instructions 331 in a computer-readable signal 333 which is transmitted via a wireless (or wired) interface (for example via the Internet) to the computer data reading device 334 for loading the instructions 331 into a controller. In such an embodiment the computer-readable signal 333 is one type of a computer-readable medium 330.

The instructions may be stored in a memory (not shown explicitly in FIG. 8, but referenced as 240 in FIG. 7) of the laptop computer 334.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The various functionality described above with reference to FIGS. 1-5 may be performed in part or fully in a wireless communication device 100/200 comprising a controller as disclosed above with reference to FIGS. 6A, 6B and 7, and/or caused to be performed by executing instructions stored on a computer-readable medium as disclosed with reference to FIG. 8.

The invention has mainly been described above with reference to a few embodiments. However, as is readily appreciated by a person skilled in the art, other embodiments than the ones disclosed above are equally possible within the scope of the invention, as defined by the appended patent claims.

Figure 2B:
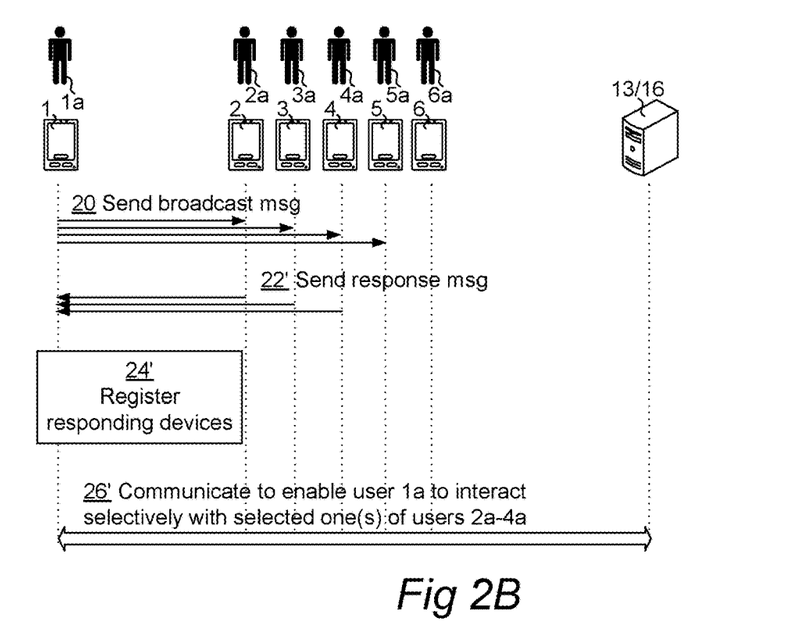
FIG. 2B illustrates establishment of the bubble for a user of a first wireless communication device on a generic technical level according to related art.

Alternative art, not part of the presently claimed invention, is illustrated in FIG. 2B. Here, different from FIG. 2A, the other wireless communication devices 2, 3, 4, 5, which receive the short-range wireless beacon broadcast message sent from the first wireless communication device 1 in the first step 20, may react in a second step 22' by sending a response message back to the first wireless communication device 1. The first wireless communication device 1 will register the responding devices among the other wireless communication devices in a third step 24'. In FIG. 2B, devices 2, 3 and 4 are therefore registered by the first wireless communication device 1 in step 24', among the devices 2, 3, 4 and 5 which received the short-range wireless beacon broadcast message in step 20. The first wireless communication device 1 now has a mapping between its own identity and the identities of the other devices 2, 3 and 4, and therefore sufficient information to define the current bubble for the first wireless communication device 1. As already explained above for FIG. 2A, there is typically a one-to-one relation between an identity of one of the other devices 2, 3 or 4 and its respective user 2a, 3a or 4a.

Thus, the alternative art of FIG. 2B can be seen as a method of establishing a dynamic, proximity-based group of wireless communication devices 2, 3, 4 to support potential interaction between a user 1a of a first wireless communication device 1 and one or more users 2a, 3a, 4a of the wireless communication devices in said dynamic, proximity-based group, the method comprising:

the first wireless communication device sending, 20, a short-range wireless beacon broadcast message to other wireless communication devices 2, 3, 4, 5 in a proximity zone 10 around the first wireless communication device, the short-range wireless beacon broadcast message being adapted for requesting the other wireless communication devices to send, 22', a response message to the first wireless communication device;

the first wireless communication device registering, 24', responding devices 2, 3, 4 among said other wireless communication devices; and the first wireless communication device communicating, 26', with the server to enable the user of the first wireless communication device to interact selectively with one or more of the users of the registered wireless communication devices, said one or more users 2a, 3a being less than all users 2a, 3a, 4a of the registered wireless communication devices.

The inventive functionalities described above for FIGS. 3-5 can be applied also to the alternative art according to FIG. 2B. For instance, the optional step 29 may be beneficially used by the first wireless communication device 1 sending to the server 13/16 a request for information about the responding devices 2, 3 and 4 which have been registered by the first wireless communication device 1 in step 24'. The request in step 29 may contain the UUIDs for the registered responding devices 2, 3, 4.

The applicant reserves the right to prosecute the subject matter of the alternative art according to FIG. 2B, and the inventive functionalities described above for FIGS. 3-5 when applied thereto, further in one or more patent applications.

While the alternative art according to FIG. 2B certainly is considered to have its benefits, there are on the other hand one or more beneficial technical effects which may be obtained by the approach in FIG. 2A compared to the alternative art in FIG. 2B.

A first such technical effect of the approach in FIG. 2A over the alternative art in FIG. 2B is a substantial reduction in the time it takes to define the dynamic proximity-based group of wireless communication devices (a.k.a. the ad-hoc network). This is so, because the approach in FIG. 2A requires only a single local broadcast from the first wireless communication device, as compared to multiple local response broadcasts from multiple other wireless communication device devices in the proximity like in FIG. 2B.

Hence, in a system like the claimed invention, where the other wireless communication devices respond by communicating directly with the server already at the stage of discovery, the server may start preparing for the subsequent selective interaction support by, for instance, retrieving and compiling relevant attribute information about the first wireless communication device and the responding other wireless communication devices, without having to wait until the first wireless communication device has received local response broadcast messages from the other wireless communication devices.

It is to recalled that short-range wireless beacon broadcast messaging (such as iBeacon/Bluetooth Low Energy) is considerably slower than typical server communication (such as IEEE 802.11, W-CDMA/HSPA, UMTS, LTE).

A second technical effect of the approach in FIG. 2A over the alternative art in FIG. 2B is an improved accuracy in defining the dynamic proximity-based group of wireless communication devices. The definition of the dynamic proximity-based group depends only on a single broadcast sent by the first wireless communication device. For successful discovery, it is only required that the other wireless communication devices receive the single broadcast message from the first wireless communication device, instead of (as in FIG. 2B) requiring an additional local response broadcast message from each one of the other wireless communication devices. Since the wireless communication devices are mobile in a radio environment, it is likely that a local response broadcast message from at least one or even several of the other wireless communication devices will in fact not be received by the first wireless communication device. As a result, a dynamic proximity-based group will be defined which contains fewer devices than those that have actually received the broadcast from the first wireless communication device.

It is to recalled that short-range wireless beacon broadcast messaging (such as iBeacon/Bluetooth Low Energy) is generally less reliable than typical server communication (such as IEEE 802.11, W-CDMA/HSPA, UMTS, LTE), because of the inherent limited operational range and the typical non-stationary behaviour of the mobile devices (or their users).

The inventive approach in FIG. 2A has an advantage in the accuracy in defining the dynamic proximity-based group also from a timing perspective at the time the broadcast is being made by the first wireless communication device. In a mobile environment employing the alternative system design in FIG. 2B it is quite possible that one or more of the other devices should rightfully belong to the dynamic proximity-based group for the first device when the discovery broadcast is being made by the first device, but the local response broadcast may not reach the first device as the other device has moved away from the first device at the time when its local response broadcast is being sent back.

A third technical effect of the approach in FIG. 2A over the alternative art in FIG. 2B is a simplified and yet secure local signalling. In the inventive system design according to FIG. 2A, the broadcast message from the first wireless communication device only has to contain its identity, which is then forwarded to the server by the responding other wireless communication devices. In FIG. 2B, the local signalling protocol will have to be more complex to include information that differentiates a broadcast message from the first device from the broadcast responses from the other devices.

From a security perspective, with the claimed invention, the responding other devices do not have to send their identities locally to the first device but only over a protocol to the server which is typically more secure (such as a secure https protocol)

The invention claimed is:

1. A method of establishing a dynamic, proximity-based group of wireless communication devices to support potential interaction between a user of a first wireless communication device and one or more users of the wireless communication devices in said dynamic, proximity-based group, the method comprising:

the first wireless communication device sending a short-range wireless beacon broadcast message to other wireless communication devices in a proximity zone around the first wireless communication device, the short-range wireless beacon broadcast message being adapted for requesting the other wireless communication devices to send a response message to a server;

the server registering responding devices among said other wireless communication devices;

the first wireless communication device communicating with the server to enable the user of the first wireless communication device to interact selectively with one or more of the users of the registered wireless communication devices, said one or more users being less than all users of the registered wireless communication devices; and providing, in a user interface of the first wireless communication device, one or more of the following:
information about identities of the users of the registered wireless communication devices:
an indication of a number of the users of the registered wireless communication devices; and
information which categorizes the users of the registered wireless communication devices into one or more categories.

2. The method as defined in claim 1, wherein the first wireless communication device communicating with the server involves:
the first wireless communication device retrieving from the server compiled information about the registered wireless communication devices.

3. The method as defined in claim 2, wherein the retrieved information comprises
identifying information about the registered wireless communication devices.

4. The method as defined in claim 3, further comprising:
the first wireless communication device presenting the retrieved information in the user interface.

5. The method as defined in claim 4, further comprising:
the first wireless communication device detecting a command by the user, the command pertaining to a selection of a device or a user among the wireless communication devices or users in the presented information; and
the first wireless communication device initiating selective interaction with the selected user or device.

6. The method as defined in claim 5, wherein the selective interaction involves one or more of the following:
telephone call,
short text messaging,
multimedia messaging,
email messaging,
chat conversation,
content sharing, and
social media invitation/friending.

7. The method as defined in claim 4, further comprising:
the first wireless communication device detecting a command by the user, the command pertaining to a selection of a device or a user among the wireless communication devices or users in the presented information; and
the first wireless communication device sending an additional information request to the server or an external service provider for the selected user or its device.

8. The method as defined in claim 7, further comprising:
the first wireless communication device receiving, in response to the additional information request, additional information from the server or external service provider about the selected user or its device; and
the first wireless communication device presenting the received additional information in the user interface.

9. The method as defined in claim 8, wherein the received additional information contains user profile information related to the user of the selected device.

10. The method as defined in claim 8, further comprising:
the first wireless communication device detecting the command by the user, the command pertaining to the selected user or its device; and
the first wireless communication device initiating selective interaction with the selected user or its device.

11. The method as defined in claim 1, wherein the information about the identities of the users contains user profile information related to the users of the registered wireless communication devices.

12. The method as defined in claim 1, further comprising:
the first wireless communication device sending a sharing request to the server, the sharing request relating to content to be made shareable by the server;
the first wireless communication device sending a sharing announcement to other wireless communication devices in a proximity of the first wireless communication device, said sharing announcement being either said short-range wireless beacon broadcast message or a second short-range wireless beacon broadcast message, and said sharing announcement being adapted for notifying the other wireless communication devices about the shareable content being accessible at said server; and
said server applying, for each of said other wireless communication devices which are requesting access to said shareable content, a sharing constraint rule for limiting the access to said shareable content to a subgroup of all of said other wireless communication devices in the proximity of the first wireless communication device, so that each requesting device is either admitted to receive the shareable content, or not admitted to receive shareable content.

13. The method as defined in claim 12, wherein the sharing constraint rule to be applied by the server is defined by the first wireless communication device or its user.

14. The method as defined in claim 13, further comprising:
the first wireless communication device detecting, in the user interface thereof, a selection made by the user of the first wireless communication device of the sharing constraint rule to be applied by the server; and
the first wireless communication device instructing the server about the selected sharing constraint rule.

15. The method as defined in claim 13, wherein the sharing constraint rule is defined such that requesting devices which are spatially close to the first wireless communication device are admitted to receive the shareable content.

16. The method as defined in claim 15, wherein the sharing constraint rule is defined to reflect that requesting devices which are in a same room as the first wireless communication device are admitted to receive the shareable content.

17. The method as defined in claim 15, wherein the sharing constraint rule is based on a distance ranking of the requesting devices with respect to the first wireless communication device.

18. The method as defined in claim 13, the first wireless communication device being connected to a wireless local area network, wherein the sharing constraint rule is defined such that requesting devices which are connected to the same wireless local area network as the first wireless communication device, are admitted to receive the content to be shared.

19. The method as defined in claim 13, wherein the sharing constraint rule is defined such that requesting devices which belong to a certain category are admitted to receive the content to be shared.

20. The method as defined in claim 19, wherein the admitted category relates to requesting devices, the users of which are known to the user of the first wireless communication device.

21. The method as defined in claim 13, further comprising:
the server keeping record of a previous content sharing resulting from application of a previous sharing constraint rule for a previous set of the requesting devices, wherein the sharing constraint rule is defined such that responding devices which were admitted to receive the previous shareable content, are admitted to receive the present shareable content.

22. The method as defined in claim 13, wherein the sharing constraint rule defines a first-come-first-served principle, such that only the n temporally first ones among the requesting devices are admitted to receive the content to be shared, n being an integer value ≥1 and less than a threshold value.

23. The method as defined in claim 12, wherein the sharing constraint rule to be applied by the server is defined individually by the requesting device or its user.

24. The method as defined in claim 23, wherein the sharing constraint rule is defined such that the requesting device will only be admitted to receive the shareable content if the requesting device is spatially close to the first wireless communication device.

25. The method as defined in claim 23, wherein the sharing constraint rule is defined such that the requesting device will only be admitted to receive the shareable content if the requesting device is in a same room as the first wireless communication device.

26. The method as defined in claim 23, the requesting device being connected to a wireless local area network, wherein the sharing constraint rule is defined such that the requesting device will only be admitted to receive the shareable content if the requesting device is connected to the same wireless local area network as the first wireless communication device.

27. The method as defined in claim 23, wherein the sharing constraint rule is defined such that the requesting device will only be admitted to receive the shareable content if the first wireless communication device belongs to a certain category.

28. The method as defined in claim 27, wherein the admitted category is where the user of the first wireless communication device is known to the user of the requesting device.

29. The method as defined in claim 23, further comprising:
the server keeping record of a previous content sharing resulting from application of a previous sharing constraint rule for the requesting device, wherein the sharing constraint rule is defined such that the requesting device will only be admitted to receive the present shareable content if the requesting device was admitted to receive the previous shareable content.

30. The method as defined in claim 29, wherein the sharing constraint rule defines a first-come-first-served principle, such that the requesting device will only be admitted to receive the shareable content if the requesting device is among the n temporally first ones among the requesting devices, n being an integer value ≥1 and less than a threshold value.

31. A first wireless communication device, configured to:
send a short-range wireless beacon broadcast message to other wireless communication devices in a proximity zone around the first wireless communication device, the short-range wireless beacon broadcast message being adapted for requesting the other wireless communication devices to send a response message to a server, the server being configured to register responding devices among said other wireless communication devices;
communicate with the server to enable a user of the first wireless communication device to interact selectively with one or more users of the registered wireless communication devices, said one or more users being less than all users of the registered wireless communication devices; and
provide, in a user interface of the first wireless communication device, one or more of the following:
information about identities of the users of the registered wireless communication devices:
an indication of a number of the users of the registered wireless communication devices; and
information which categorizes the users of the registered wireless communication devices into one or more categories.

32. A server for use with the first wireless communication device as defined in claim 31, the server being configured to:
register the responding devices among said other wireless communication devices; and
communicate with the first wireless communication device to enable the user of the first wireless communication device to interact selectively with the one or more of the users of the registered wireless communication devices, said one or more users being less than all users of the registered wireless communication devices.

* * * * *